(No Model.) 2 Sheets—Sheet 1.

G. H. OBER.
LATHE FOR TURNING IRREGULAR FORMS.

No. 244,925. Patented July 26, 1881.

(No Model.) 2 Sheets—Sheet 2.

G. H. OBER.
LATHE FOR TURNING IRREGULAR FORMS.

No. 244,925. Patented July 26, 1881.

Witnesses.
J. H. Burridge
E. E. Beach

Inventor.
G. H. Ober
Wm. H. Burridge
Atty

United States Patent Office.

UNITED STATES PATENT OFFICE.

GEORGE H. OBER, OF CHAGRIN FALLS, OHIO.

LATHE FOR TURNING IRREGULAR FORMS.

SPECIFICATION forming part of Letters Patent No. 244,925, dated July 26, 1881.

Application filed May 31, 1881. (No model.)

*To all whom it may concern:*

Be it known that I, GEORGE H. OBER, of Chagrin Falls, in the county of Cuyahoga and State of Ohio, have invented new and useful Improvements in Lathes for Turning Irregular Forms, of which the following is a specification.

The nature of the improvements relates to so arranging the elements of the machine that the axial line of the shaft carrying the head of cutters and the axial lines of the revolving pattern and the stock or stick being turned are intersected transversely by a circumferential line having its center in the axial line of the vibrating frame carrying the said pattern and stock—that is to say, the axial center of the cutter-head and the axial centers of the revolving pattern and revolving stock are in the same circumferential line, having its center in the pivotal center of the vibrating frame, thereby causing the said frame to carry the stock toward the axial line of the revolving cutter-head.

A further improvement consists in giving to an arm vibrating the frame above alluded to a curve segmental of the circumference of the cutter-head, and having its center in the above-said circumferential line drawn through the axis of the cutter-head and the axis of the pattern and stock, so that the bearing-point of the arm on the pattern will be in the said circumferential line, whereas the lower end of the arm is attached to a shaft the axis of the vibrating frame or carriage.

A further improvement consists in sliding the vibrating carriage carrying the above-said pattern and stock by means of a screw and a two-part nut, as hereinafter described.

The above-mentioned inventions are improvements on a lathe for turning irregular forms for which a patent was granted to me the 27th day of June, 1865.

Figure 1:
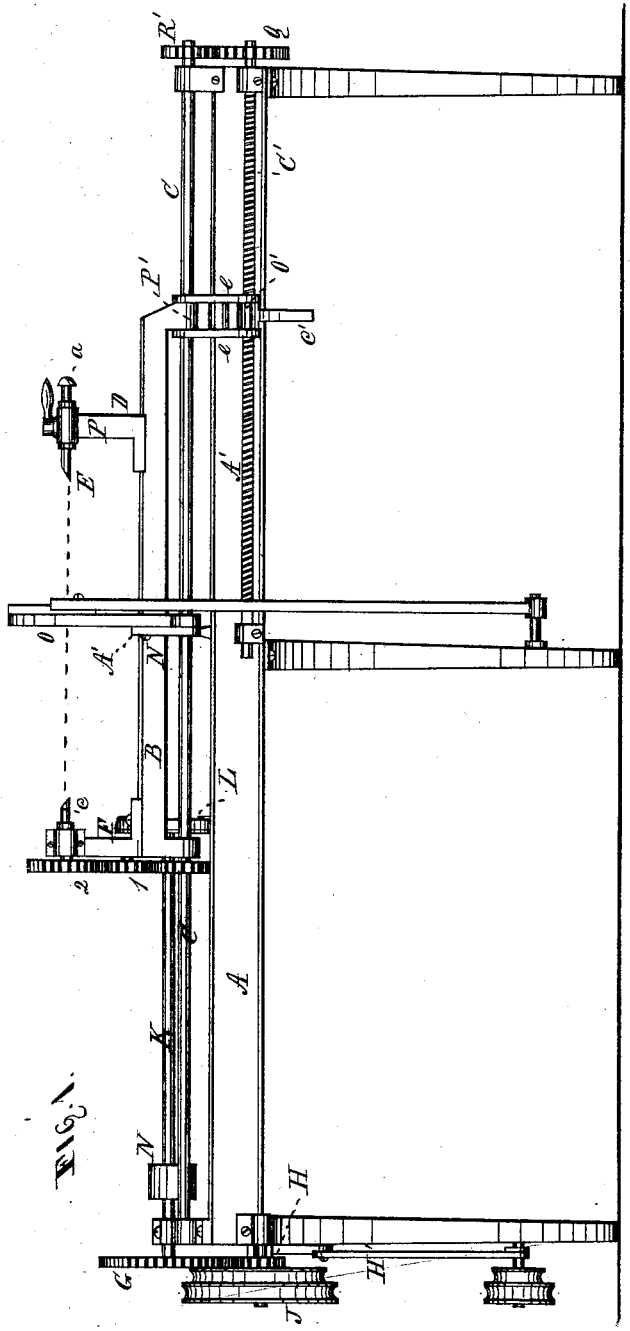
Figure 2:
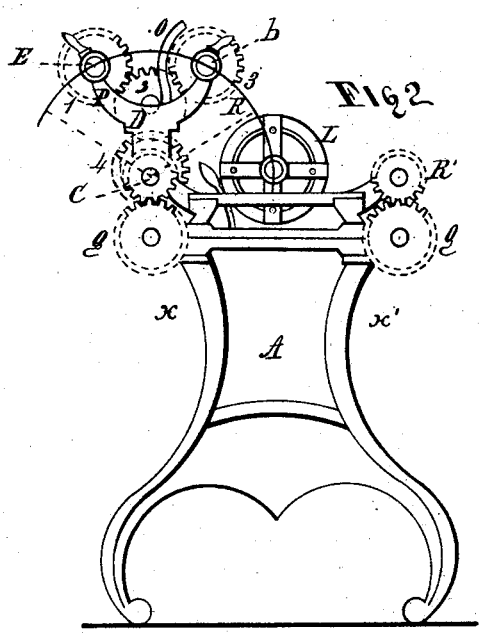
Figure 3:
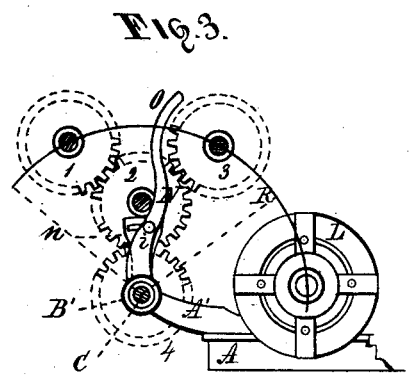
Figure 4:
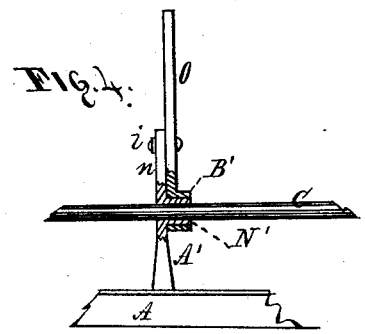

Of the drawings, Figure 1 represents a side elevation of the machine. Fig. 2 shows an end view. Figs. 3 and 4 are detached sections.

Like letters of reference refer to like parts in the several views.

As shown in the drawings, A represents the frame of the machine; B, the sliding vibrating carriage or frame supported upon the shaft C, on which it both slides and vibrates.

On the top of the frame is secured an adjustable bifurcated standard, D, Figs. 1 and 2. In the end of the arm P of the standard is a center, E, Fig. 1. In the other arm is a similar center, $b$, Fig. 2. At the opposite end of the carriage is a stationary corresponding bifurcated standard, F, Fig. 1, provided with centers respectively corresponding to the centers E and $b$ of the adjustable standard alluded to. $c$, one of the said centers, is shown in Fig. 1. The two centers $c$ and E are for holding the pattern of the article to be turned; and the center $b$, with its opposite corresponding center in the standard F, are for holding the stock to be turned from the pattern held in the centers $c$ and E.

1 and 2 are wheels, respectively for revolving the stock and pattern, actuated by the wheel 2 engaging the wheel 4 on the shaft C, to which it is secured by a feather, and revolves thereby. Said shaft C is turned by a cog-wheel, G, and pinion H, Fig. 1, driven by a band-wheel, J, suitably connected to a driving-power. The pinion is engaged and disengaged with the cog-wheel G by a shifting device or clutch, such as is ordinarily used for similar purposes. K is a shaft carrying the head of cutters, L. Said shaft is driven by a band applied to the pulley N.

To the top of the frame A of the lathe is secured a rigid arm, A', Fig. 3. The elbow of the arm is provided with hub N', Fig. 4, through which the shaft C passes and has its central bearing. In the arm, above the elbow, is a transverse curved slot, $n$, having its radius in the center of the shaft C. On the hub of said arm A' is fitted loosely the hub of an adjustable arm, O, and secured to the rigid arm A' by a bolt, $i$, passing through the slot $n$. The curve of the upper end of the arm O is an arc of a circle having a radius of the same length as that of the cutter-head and its center in the line R, so that the vibratory center of the frame B, arm O, centers of the pattern, stock, cutter-head, and the slot $n$, all have one common center in the shaft C; and the centers of the pattern, stock, cutter-head, and the point of contact of the arm O with the pattern all in the circumferential line R.

The above-specified parts of the lathe are constructed and arranged in manner, or may be, similar to my patented machine above referred to, differing from that only in some minor details, with the exception of the improvements above specified, which do not essentially change the general working of the machine. Hence a more full description of the several parts mentioned is not deemed necessary in this place, as it may be learned from the specification of my patented machine.

In my old machine the frame or carriage B was given a sliding movement on the shaft C by a rack and endless screw or worm. In this my improved lathe I use a screw, C', and a two-part nut, O', for moving the carriage. The nut is suspended from the shaft C by hangers or straps e, one on each side of the foot P' of the said carriage or frame B, as seen in Fig. 1. The nut is held between the lower ends of the hangers, so as to inclose the screw C', which is operated by the wheel Q in its engagement with the wheel R' on the end of the shaft C, on which shaft the carriage slides and vibrates. The nut is closed by a lever and opened by the impingement of an arm of the nut on an inclined lug on the arrival of the nut at the end of the article being turned, and by a suitable and ordinary mechanism is held open for the return of the carriage or vibrating frame. The rack and worm of my old machine can be used in this my new lathe with the other improvements. The screw and nut, however, are preferred.

The arm O above alluded to is arranged substantially in the same relation to the vibrating carriage and the pattern in this my new lathe as in the old one, and used for the same purpose; but the new arm differs from the old one in this particular: The latter was not curved, or but slightly, and was not of the same arc of a circle having the same diameter as the cutter-head, nor was the lower end of the arm hinged to the shaft C; hence the bearing-point of the arm on the pattern was not in the line R. Therefore, in its vibrating the carriage by contact with the revolving pattern, the stick, while being turned, was not carried directly toward the axial line of the cutter-head at all times, but sometimes on one side and then upon the other, according to the irregular form of the work or pattern, the result of which was a failure to produce an exact copy of the pattern, either in size or shape, unless great care was used and repeated trials made in adjusting the arm to the pattern. The results, then, were not always the same. This care in adjusting the arm, and consequent trouble, is mainly avoided by making the curve of the arm O an arc of a circle having a radius of the same length as the radius of the cutter-head and its center in the line R, and the lower end of the arm hinged to the shaft C, the axial center of the vibrating carriage. By the above means, co-operating with others presently described, I am enabled to produce an article of the exact size and shape of the pattern.

In my old lathe the axial center of the cutter-head and the axial centers of the pattern and stock were not in the same arc of a circle having its center in the axial line of the shaft C, the vibratory center of the carriage holding the pattern and stock, in consequence of which a true copy of the shape and size of the pattern could not be produced. An approximation only could be obtained. Nor could the same pattern be used on either side of the lathe and produce equal results; nor could the same pattern be used on another lathe of the same kind and be attended with favorable results; hence special patterns were required for each side of the same lathe, and for each one. These objectionable features are all avoided in this my improved machine by having the axial centers of the pattern and stock and the axial center of the cutter-head and the bearing-point of the arm O on the pattern all in the same arc of a circle, as indicated by the line R, and having a common center in the shaft C, as above described. By this arrangement of the several parts of the lathe—viz., the pattern, stock, cutter-head, arm O, and the carriage bearing the said pattern and stock, all working from a common center—that is to say, from the shaft C—an exact copy of the pattern can be produced invariably, whether the pattern is used on the left-hand side of the machine or on the right, or on another lathe of the same construction. The co-operation of the several parts of the lathe, arranged relatively to each other as above set forth, carries the stock being turned directly toward the axial line of the cutter-head, irrespective of great irregularity in the shape of the pattern, which could not be done in my old machine.

It will be proper to say in this place that the lathe herein described is a double one—that is to say, on one side of the frame A, as seen at $x$ in Fig. 2, are arranged all the parts of the lathe, as above specified, (excepting the head of cutters,) and on the opposite side, as at $x'$, is arranged a similar combination of parts, constituting two lathes in the one frame A, and having between them, in common, the revolving head of cutters; hence a description of the one is a description of the other.

What I claim as my invention, and desire to secure by Letters Patent, is—

1. In lathes for turning irregular forms, the vibrating frame or carriage carrying the pattern and stock, having its axis of vibration in the shaft C and the axis of the revolving pattern and stock held in said carriage and the axial center of the cutter-head all in a circumferential line, R, having its center in the axis of said shaft, substantially in the manner as described, and for the purpose specified.

2. With the vibrating carriage or frame carrying the revolving pattern and stock, having their centers in the circumferential line R, the combination of the adjustable arm O, hinged to the shaft C, and having its upper end terminating in an arc of a circle the radius of which is of the same length as the radius of the cutter-head, which has its center in the said line R, substantially as set forth, and for the purpose specified.

3. The adjustable arm O, hinged to the shaft C, and having its point of adjustment at the slot *n* in the rigid arm A', to which the said arm O is secured by a bolt inserted in the slot, substantially as described, and for the purpose set forth.

In testimony whereof I affix my signature in presence of two witnesses.

GEORGE H. OBER.

Witnesses:
J. H. BURRIDGE,
E. C. BEACH.